US012658468B2

(12) United States Patent
Kaji et al.

(10) Patent No.: US 12,658,468 B2

(45) Date of Patent: Jun. 16, 2026

(54) ELECTROLYTE AND POWER STORAGE DEVICE

(71) Applicant: DKS Co. Ltd., Kyoto (JP)

(72) Inventors: Soki Kaji, Kyoto (JP); Yasuteru Saito, Kyoto (JP)

(73) Assignee: DKS CO. LTD., Kyoto (JP)

( * ) Notice: Subject to any disclaimer, the term of this patent is extended or adjusted under 35 U.S.C. 154(b) by 772 days.

(21) Appl. No.: 17/913,517

(22) PCT Filed: Mar. 15, 2021

(86) PCT No.: PCT/JP2021/010431

§ 371 (c)(1),
(2) Date: Sep. 22, 2022

(87) PCT Pub. No.: WO2021/193203

PCT Pub. Date: Sep. 30, 2021

(65) Prior Publication Data

US 2023/0106336 A1 Apr. 6, 2023

(30) Foreign Application Priority Data

Mar. 27, 2020 (JP) ................................ 2020-058183
Oct. 7, 2020 (JP) ................................ 2020-170080

(51) Int. Cl.
*H01M 10/056* (2010.01)
*H01M 10/0525* (2010.01)

(52) U.S. Cl.
CPC ..... *H01M 10/056* (2013.01); *H01M 10/0525* (2013.01); *H01M 2300/0065* (2013.01)

(58) Field of Classification Search
None
See application file for complete search history.

(56) References Cited

U.S. PATENT DOCUMENTS

2009/0202816 A1* 8/2009 Schlenoff ............ C09K 3/1409 977/773
2016/0372757 A1 12/2016 Kim et al.
2021/0075054 A1 3/2021 Nishimura et al.

FOREIGN PATENT DOCUMENTS

JP 2016-530676 A 9/2016
JP 6562184 B2 8/2019
KR 1979897 B1 * 5/2019 ............ C01B 33/18

OTHER PUBLICATIONS

KR-1979897-B1 Translation from Espacenet (Year: 2019).*
Scifinder structure search (Year: 2019).*
International Search Report for PCT/JP2021/010431 (PCT/ISA/210) mailed on May 11, 2021.
Written Opinion of the International Searching Authority for PCT/JP2021/010431 (PCT/ISA/237) mailed on May 11, 2021.

* cited by examiner

*Primary Examiner* — Nathanael T Zemui
(74) *Attorney, Agent, or Firm* — Birch, Stewart, Kolasch & Birch, LLP

(57) ABSTRACT

A technique that can improve ionic conductivity is provided. An electrolyte includes an inorganic composite particle that is a composite of an inorganic particle with a compound having a betaine structure and one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms).

6 Claims, No Drawings

ELECTROLYTE AND POWER STORAGE DEVICE

TECHNICAL FIELD

The present invention relates to an electrolyte and a power storage device.

BACKGROUND ART

For example, power storage devices such as lithium ion secondary batteries are power devices having high energy densities and thus have been widely used recently as power supplies for terminals such as laptop computers and cellular phones (for example, PTL 1). To improve the ionic conductivity of such a power storage device, an electrolyte containing an inorganic particle such as aluminum oxide or silicon oxide is used in PTL 1.

CITATION LIST

Patent Literature

PTL 1: Japanese Patent No. 6562184

SUMMARY OF INVENTION

Technical Problem

However, the electrolyte disclosed in PTL 1 does not have sufficient ionic conductivity, and there is room for improvement. Thus, development of other methods to improve ionic conductivity has been desired.

Solution to Problem

The present invention has been made to solve the above problem and can be practiced in the following aspects.

(1) According to an aspect of the present invention, an electrolyte is provided. The electrolyte includes an inorganic composite particle that is a composite of an inorganic particle with a compound having a betaine structure and one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms).

According to the electrolyte in this aspect, ionic conductivity can be improved.

(2) In the above electrolyte, the one or more functional groups may be one or more selected from a (meth) acryloxy group and a $Si(OR)_3$ group (R is a hydrogen atom or an alkyl group having 1 to 3 carbon atoms).

According to the electrolyte in this aspect, ionic conductivity can be further improved.

(3) In the above electrolyte, the betaine structure may have a quaternary ammonium cation and one or more selected from $SO_3^-$, $PO_3H^-$, and $COO^-$.

According to the electrolyte in this aspect, ionic conductivity can be further improved.

(4) In the above electrolyte, a content of the compound may be 0.1 parts by mass or more and 10 parts by mass or less relative to 100 parts by mass of a content of the inorganic particle.

According to the electrolyte in this aspect, ionic conductivity can be further improved.

(5) In the above electrolyte, the inorganic particle may have a BET specific surface area of 1.0 $m^2/g$ or more.

According to the electrolyte in this aspect, ionic conductivity can be further improved.

(6) In the above electrolyte, a content of the inorganic composite particle may be 1 part by mass or more and 50 parts by mass or less relative to 100 parts by mass of the electrolyte.

According to the electrolyte in this aspect, ionic conductivity can be further improved.

The present invention can be practiced in various forms, for example, in the form of a power storage device including the electrolyte.

DESCRIPTION OF EMBODIMENTS

A. Embodiment

A1. Electrolyte

An electrolyte according to an embodiment of the present invention includes an inorganic composite particle that is a composite of an inorganic particle with a compound having a betaine structure and one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms). In this specification, "composite" refers to a state of being bound to each other through, for example, an ionic bond, a covalent bond, a hydrogen bond, van der Waals force, or the like. According to the electrolyte of this embodiment, ionic conductivity can be improved although its mechanism is not clear.

In this specification, "one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms)" is also referred to simply as a "functional group".

In this specification, a "compound having a betaine structure and one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms)" is also referred to simply as "betaine". In this specification, "betaine structure" refers to a structure which has a positive charge and a negative charge at positions not adjacent to each other in the same molecule and in which dissociable hydrogen is not bonded to the atom having the positive charge.

The betaine in this embodiment is not particularly limited, and is represented by the following general formula.

$$Y\text{-}A\text{-}N^+R^1R^2\text{—}B\text{—}Z^-$$

Y represents a (meth)acryloxy group, a $Si(OR)_3$ group (R is a hydrogen atom or an alkyl group having 1 to 3 carbon atoms), or an $Al(OR)_2$ group (R is a hydrogen atom or an alkyl group having 1 to 3 carbon atoms). $Z^-$ represents $SO_3^-$, $PO_3H^-$, or $COO^-$. A and B each independently represent an alkylene group having 1 to 6 carbon atoms. A and B are preferably each independently an alkylene group having 2 to 4 carbon atoms. $R^1$ and $R^2$ each independently represent an alkyl group having 1 to 6 carbon atoms. $R^1$ and $R^2$ are preferably each independently an alkyl group having 2 to 4 carbon atoms.

Examples of the betaine in this embodiment include, but are not limited to, N,N-dimethyl-(trihydroxysilyl)propyl-N-sulfopropyl-ammonium, inner salt (hereinafter also referred to as "compound A"), [2-(methacryloyloxy)ethyl]dimethyl (3-sulfopropyl)ammonium hydroxide, inner salt (hereinafter also referred to as "compound B"), 1-propanaminium, N,N-dimethyl-N-(3-phosphonopropyl)-3-(trimethoxysilyl)-, inner salt (hereinafter also referred to as "compound C"), 1-propanaminium, 3-carboxy-N,N-dimethyl-N-[3-(trimethoxysilyl)propyl]-, inner salt (hereinafter also referred to as "compound D"), and 1-propanaminium, N,N-dimethyl-N-(3-boronopropyl)-3-(trimethoxysilyl)-, inner salt.

Among the above betaines, from the viewpoint of improving ionic conductivity, one or more selected from N,N-dimethyl-(trihydroxysilyl)propyl-N-sulfopropyl-ammonium, inner salt (compound A), [2-(methacryloyloxy)ethyl] dimethyl(3-sulfopropyl)ammonium hydroxide, inner salt (compound B), 1-propanaminium, N,N-dimethyl-N-(3-phosphonopropyl)-3-(trimethoxysilyl)-, inner salt (compound C), and 1-propanaminium, 3-carboxy-N,N-dimethyl-N-[3-(trimethoxysilyl)propyl]-, inner salt (compound D) are preferred, and more preferably, N,N-dimethyl-(trihydroxysilyl)propyl-N-sulfopropyl-ammonium, inner salt (compound A) is included. From the viewpoint of improving ionic conductivity, the betaine in this embodiment preferably has a quaternary ammonium cation and at least one of a sulfo group and a carboxy group.

Examples of the functional group of the betaine in this embodiment include, but are not limited to, a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms). Among these functional groups, from the viewpoint of improving ionic conductivity, one or more selected from a (meth)acryloxy group and a $Si(OR)_3$ group (R is a hydrogen atom or an alkyl group having 1 to 3 carbon atoms) are preferred. The (meth)acryloxy group includes a methacryloxy group and an acryloxy group.

Examples of the inorganic particle combined with the betaine in this embodiment include, but are not limited to, particles of inorganic oxides. Examples of the inorganic oxides include, but are not limited to, inorganic oxides containing Li, Mg, Al, Si, Ca, Ti, Zr, La, Na, K, Ba, Sr, V, Nb, B, Ge, or the like as a constituent element.

More specific examples of the inorganic particle combined with the betaine in this embodiment include $Al_2O_3$ (alumina), $Li_{1+x+y}Ti_{2-x}Al_xP_{3-y}Si_yO_{12}$ ($0<x<2$, $0<y<3$) (LATP), $Li_7La_3Zr_2O_{12}$ (LLZ), $La_{2/3-x}Li_{3x}TiO_3$ (LLT), $Li_{1.5}Al_{0.5}Ge_{1.5}(PO_4)_3$ (LAGP), $SiO_2$, $TiO_2$, ZnO, AlOOH, $ZrO_2$, $BaTiO_3$, and zeolites. Examples of the zeolites include, but are not limited to, those having the following structure.

$$(M_I,M_{II1/2})_m(Al_mSi_nO_{2(m+n)})\cdot xH_2O$$

In the formula, n and m satisfy $n\geq m>0$, and x satisfies $x\geq 0$. In the formula, $M_I$ represents a monovalent metal ion such as $Li^+$, $Na^+$, or $K^+$, and $M_{II}$ represents a divalent metal ion such as $Ca^{2+}$, $Mg^{2+}$, or $Ba^{2+}$.

From the viewpoint of improving ionic conductivity, the BET specific surface area of the inorganic particle is preferably 1.0 $m^2/g$ or more, more preferably 2.0 $m^2/g$ or more, still more preferably 3.0 $m^2/g$ or more. On the other hand, the BET specific surface area of the inorganic particle is preferably 800 $m^2/g$ or less, more preferably 400 $m^2/g$ or less, still more preferably 100 $m^2/g$ or less. In this specification, the BET specific surface area is a value measured in accordance with JIS Z 8830:2013.

The content ratio of the betaine in this embodiment to the inorganic particle to be combined is not particularly limited, but, for example, the content of the betaine relative to 100 parts by mass of the content of the inorganic particle is preferably 0.1 parts by mass or more, more preferably 0.3 parts by mass or more, still more preferably 0.5 parts by mass or more, and preferably 10 parts by mass or less, more preferably 8 parts by mass or less, still more preferably 7 parts by mass or less.

The content of the inorganic composite particle in this embodiment is not particularly limited, but is, for example, preferably 1 part by mass or more, more preferably 2 parts by mass or more, still more preferably 5 parts by mass or more, and preferably 50 parts by mass or less, more preferably 30 parts by mass or less, still more preferably 20 parts by mass or less, relative to 100 parts by mass of the electrolyte.

The electrolyte may contain a polymer. The polymer is not particularly limited, and a suitable compound can be selected depending on, for example, the composition or the type of application (electrochemical device) of the electrolyte according to the present disclosure. Examples of the polymer include acrylate compounds and oxetane compounds.

Examples of the acrylate compounds include, but are not limited to, tetrafunctional polyether acrylates, bifunctional polyether acrylates, other AO-added acrylates, and polyethylene glycol diacrylate.

Examples of the oxetane compounds include, but are not limited to, methyl methacrylate-oxetanyl methacrylate copolymers. These polymers may be used alone, or two or more of them may be appropriately combined.

Examples of polymers other than the above include, but are not limited to, polyurethane, polyvinylidene fluoride (PVDF), polytetrafluoroethylene (PTFE), polyimide, polyamide, silicone (polysiloxane), styrene-butadiene rubber (SBR), and polyacrylic acid. These polymers may be used alone, or two or more of them may be appropriately combined.

As the electrolyte of this embodiment, for example, an ionic liquid containing bis(fluorosulfonyl)imide anion (FSI anion) as an anionic component may be used. Here, ionic liquids are characterized by being liquid at normal temperature (25° C.), having no volatility, and having relatively high decomposition temperatures. By using the ionic liquid as an electrolytic solution constituting the electrolyte, as compared to when a prevalent flammable organic solvent (e.g., a cyclic carbonate or a linear carbonate) is used, the electrolyte is provided with high heat resistance and safety. This also provides a high-energy-density and high-voltage battery having high performance even at the time of high-rate charge and discharge. The FSI anion may be prepared, for example, but not necessarily, by reacting fluorosulfonic acid with urea. Impurities can be identified by analysis using a plasma emission spectrometer (ICP).

The anionic component contained in the ionic liquid may contain an anion other than the FSI anion. Examples of the anion other than the FSI anion include $BF_4^-$, $PF_6^-$, $SbF_6^-$, $NO_3^-$, $CF_3SO_3^-$, $(CF_3SO_2)_2N^-$ (hereinafter also referred to as "TFSI"), $(C_2F_5SO_2)_2N^-$, $(CF_3SO_2)_3C^-$, $CF_3CO_2^-$, $C_3F_7CO_2^-$, $CH_3CO_2^-$, and $(CN)_2N^-$. Two or more of these anions may be contained as the anion other than the FSI anion.

In the ionic liquid, the above FSI anion may be combined with any cation, but it is preferable to use a cation that forms an ionic liquid having a melting point of 50° C. or lower. This can not only suppress an increase in the viscosity of a non-aqueous electrolytic solution but also suppress a decrease in discharge capacity. The non-aqueous electrolytic solution refers to a solution of a lithium salt serving as an electrolyte in a solvent for transporting lithium ions.

As the above cation, for example, a compound containing an element such as N, P, S, O, C, or Si and having, as its backbone, a chain structure or a ring structure such as a 5-membered ring or a 6-membered ring is used.

Examples of the ring structure such as a 5-membered ring or a 6-membered ring include heterocyclic structures such as a furan ring, a thiophene ring, a pyrrole ring, a pyridine ring, an oxazole ring, an isoxazole ring, a thiazole ring, an isothiazole ring, a furazan ring, an imidazole ring, a pyrazole ring, a pyrazine ring, a pyrimidine ring, a pyridazine ring, a pyrrolidine ring, a piperidine ring, a benzofuran ring, an isobenzofuran ring, an indole ring, an isoindole ring, an indolizine ring, and a carbazole ring.

Among these cations, chain or ring nitrogen-containing compounds are particularly preferred because they are industrially inexpensive and chemically and electrochemically stable.

Examples of nitrogen-containing cations include alkylammoniums such as triethylammonium; and 1-ethyl-3-methylimidazolium, 1-butyl-3-methylimidazolium, 1-methyl-1-propyl-pyrrolidinium, and methylpropylpiperidinium.

As the lithium salt dissolved in the above ionic liquid as a supporting electrolyte for the above non-aqueous electrolytic solution, any lithium salt commonly used as an electrolyte for a non-aqueous electrolytic solution can be used without particular limitation. Examples of such lithium salts include $LiPF_6$, $LiBF_4$, $LiClO_4$, $LiAsF_6$, $LiCF_3SO_3$, $LiC(CF_3SO_2)_3$, $LiN(CF_3SO_2)_2$ (LiTFSI), $LiN(FSO_2)_2$ (LiFSI), and $LiBC_4O_8$. These lithium salts may be used as a mixture of two or more. The lithium salt is preferably LiFSI or LiTFSI.

For example, these lithium salts are preferably contained in the ionic liquid at a concentration of 0.1 mol/kg or more and 3.0 mol/kg or less, more preferably contained in the ionic liquid at a concentration of 0.3 mol/kg or more and 2.0 mol/kg or less, still more preferably contained in the ionic liquid at a concentration of 0.5 mol/kg or more and 1.5 mol/kg or less.

A2. Power Storage Device

According to another embodiment, a power storage device including the above electrolyte is provided. The power storage device of this embodiment further includes a positive electrode and a negative electrode. Examples of the power storage device include, but are not limited to, lithium ion secondary batteries, electric double layer capacitors, and lithium ion capacitors. In the following, a description will be given using a lithium ion secondary battery as an example of the power storage device.

The positive electrode and the negative electrode in this embodiment are each constituted by an electrode active material, a conductive agent, a current collector, and a binder.

The positive electrode active material used for the positive electrode in this embodiment is not particularly limited as long as lithium ions can be intercalated and deintercalated. Examples of the positive electrode active material include metal oxides, composite oxides of lithium and transition metals, metal chalcogenides, and conductive polymer compounds. Examples of the metal oxides include CuO, $Cu_2O$, $MnO_2$, $MoO_3$, $V_2O_5$, $CrO_3$, $MoO_3$, $Fe_2O_3$, $Ni_2O_3$, and $CoO_3$. Examples of the metal chalcogenides include $TiS_2$, $MoS_2$, and $NbSe_3$. Examples of the conductive polymer compounds include polyacene, poly-p-phenylene, polypyrrole, and polyaniline.

The positive electrode active material is preferably a composite oxide of lithium and a transition metal because a high voltage is easily provided. Examples of the composite oxide of lithium and a transition metal include $LiCoO_2$, $LiMnO_2$, $LiMn_2O_4$, $LiNiO_2$, $LiFePO_4$, $LiNi_xCo_{(1-x)}O_2$, and $LiMn_aNi_bCo_c$ (a+b+c=1). Alternatively, a product obtained by doping a composite oxide of lithium and a transition metal with a small amount of element such as fluorine, boron, aluminum, chromium, zirconium, molybdenum, or iron or a product obtained by surface treating the particle surface of a lithium composite oxide with carbon, MgO, $Al_2O_3$, $SiO_2$, or the like may be used as the positive electrode active material. Two or more of the above positive electrode active materials may be used in combination. The amount of positive electrode active material is not particularly limited, but may be, for example, 3 $mg/cm^2$ or more and 10 $mg/cm^2$ or less per unit area of the current collector.

The negative electrode active material used for the negative electrode in this embodiment is not particularly limited as long as metallic lithium or lithium ions can be intercalated and deintercalated. Examples of the negative electrode active material include carbon materials, metal materials, lithium transition metal nitrides, crystalline metal oxides, amorphous metal oxides, silicon compounds, and conductive polymers. Examples of the carbon materials include natural graphite, artificial graphite, non-graphitizable carbon, and graphitizable carbon. Examples of the metal materials include metallic lithium, alloys, and tin compounds. Specific examples of the negative electrode active material include $Li_4Ti_5O_{12}$ and $NiSi_5C_6$. Two or more of the above negative electrode active materials may be used in combination. The amount of negative electrode active material is not particularly limited, but may be, for example, 1 $mg/cm^2$ or more and 5 $mg/cm^2$ or less per unit area of the current collector.

Examples of the conductive agent in this embodiment used for the positive electrode and the negative electrode include, but are not limited to, carbon blacks such as acetylene black and ketjen black. Instead of carbon blacks, a conductive material such as natural graphite (scale graphite, flake graphite, earthy graphite, etc.), artificial graphite, whisker carbon, carbon fiber, metal (copper, nickel, aluminum, silver, gold, etc.) powder, metal fiber, or a conductive ceramic material may be used as the conductive agent. Two or more of the above conductive materials may be used in combination. The amount of conductive material added is not particularly limited, and is preferably 1 mass % or more and 30 mass % or less, more preferably 2 mass % or more and 20 mass % or less, relative to the amount of positive electrode active material or the amount of negative electrode active material.

Examples of the current collector used for the positive electrode in this embodiment include, but are not limited to, aluminum, titanium, stainless steel, nickel, baked carbon, conductive polymers, and conductive glass. Alternatively, aluminum, copper, or the like whose surface is treated with carbon, nickel, titanium, silver, or the like for the purpose of improving adhesiveness, conductivity, and oxidation resistance may be used as the positive electrode current collector.

Examples of the current collector used for the negative electrode in this embodiment include, but are not limited to, copper, stainless steel, nickel, aluminum, titanium, baked carbon, conductive polymers, conductive glass, and Al—Cd alloys. Alternatively, copper or the like whose surface is treated with carbon, nickel, titanium, silver, or the like for the purpose of improving adhesiveness, conductivity, and oxidation resistance may be used as the negative electrode current collector.

The surface of the current collector used for the positive electrode or the negative electrode may be subjected to oxidation treatment. The shape of the current collector may be foil-like, film-like, sheet-like, or net-like. As the current collector, a punched or expanded body may be used, or a formed body such as a lath body, a porous body, or a foamed body may be used. The thickness of the current collector is not particularly limited, and may be, for example, 1 μm or more and 100 μm or less.

The binder in this embodiment is not particularly limited, and, for example, polyvinylidene fluoride (PVDF) can be used. As the binder, for example, a PVDF copolymer resin, a fluorocarbon resin, styrene-butadiene rubber (SBR), ethylene-propylene rubber (EPDM), a styrene-acrylonitrile copolymer, or the like may be used instead of PVDF. As the PVDF copolymer resin, for example, a copolymer resin of PVDF and hexafluoropropylene (HFP), perfluoromethyl vinyl ether (PFMV), or tetrafluoroethylene (TFE) may be used. As the fluorocarbon resin, for example, polytetrafluoroethylene (PTFE), fluorocarbon rubber, or the like may be used. As other binders, for example, polysaccharides such as carboxymethylcellulose (CMC) and thermoplastic resins such as polyimide resins may be used. Two or more of the above binders may be used in combination. The amount of binder added is not particularly limited, and is preferably 1 mass % or more and 30 mass % or less, more preferably 2 mass % or more and 20 mass % or less, relative to the amount of positive electrode active material or the amount of negative electrode active material.

The electrodes in this embodiment may be produced by any method. The electrodes may each be produced by, for example, mixing an electrode active material, a conductive material, a binder, and the like in a dispersion medium to prepare a slurry electrode material, applying the electrode material to a current collector, and then volatilizing the dispersion medium.

To form the above electrode material in a slurry state, a viscosity modifier may be used. The viscosity modifier is not particularly limited, and, for example, a water-soluble polymer can be used. Examples of the viscosity modifier include celluloses such as carboxymethylcellulose, methylcellulose, ethylcellulose, hydroxymethylcellulose, hydroxypropylmethylcellulose, and hydroxyethylmethylcellulose; polycarboxylic acid compounds such as polyacrylic acid and sodium polyacrylate; compounds having a vinylpyrrolidone structure such as polyvinylpyrrolidone; and polyacrylamide, polyethylene oxide, polyvinyl alcohol, sodium alginate, xanthan gum, carrageenan, guar gum, agar, and starch. Two or more of the above viscosity modifiers may be used in combination. The viscosity modifier is preferably carboxymethylcellulose.

The lithium ion secondary battery of this embodiment may further include an insulating layer. The insulating layer can be formed by, for example, applying an inorganic solid electrolyte onto the positive electrode or the negative electrode. Examples of the inorganic solid electrolyte include, but are not limited to, $Li_{1.5}Al_{0.5}Ge_{1.5}(PO_4)_3$ (LAGP), $La_{2/3-x}Li_{3x}TiO_3$ (LLT), LICGC (registered trademark), and $Li_{1+x+y}Ti_{2-x}Al_xP_{3-y}Si_yO_{12}$ ($0<x<2$, $0<y<3$) (LATP).

A separator is a member disposed between the positive electrode and the negative electrode to separate the positive electrode and the negative electrode from each other. As the separator in this embodiment, glass fiber is used. The porosity of the glass fiber in this embodiment may be 70% or more.

The lithium ion secondary battery of this embodiment can be formed into any desired shape such as cylindrical, coin, prism, and other shapes. The basic configuration of the battery does not vary depending on the shape, and the design can be changed depending on the purpose. For example, a cylindrical battery is obtained as follows: a negative electrode obtained by applying a negative electrode active material to a negative electrode current collector and a positive electrode obtained by applying a positive electrode active material to a positive electrode current collector are wound with a separator interposed therebetween, the resulting wound body is encased in a battery can, a non-aqueous electrolytic solution is injected into the battery can, and the battery can is sealed with insulating plates mounted on upper and lower parts. In the case of a coin-type lithium ion secondary battery, a stack of a disk-like negative electrode, a separator, a disk-like positive electrode, and a stainless steel plate is encased in a coin-shaped battery can, a non-aqueous electrolytic solution is injected into the battery can, and the battery can is sealed.

B. Experiment

The present invention will now be described more specifically with reference to Examples, but the present invention is not limited to the following Examples. In the examples, "%" means "mass %", and "ratio" means "mass ratio", unless otherwise specified.

B1. Experiment 1

Example 1-1

(Preparation of Electrolyte Solution)

The following operation was carried out in a dry air atmosphere with a dew point of −50° C. or lower. A tetrafunctional polyether acrylate (manufactured by DKS Co., Ltd., product name: ELEXCEL TA-210), a polymer electrolyte and also a matrix material, in an amount of 20.1 parts by mass, 46.9 parts by mass of 1-ethyl-3-methylimidazolium bis(fluorosulfonyl)imide (EMIm-FSI) (manufactured by DKS Co., Ltd., product name: ELEXCEL IL-110), an ionic liquid-based electrolyte solvent, 12.5 parts by mass of lithium bis(fluorosulfonyl)imide (LiFSI), a lithium salt, 0.5 parts by mass of 2,2'-azobis(2,4-dimethylvaleronitrile) (manufactured by Wako Pure Chemical Industries, Ltd., product name: V-65), an azo initiator, and 20 parts by mass of 1,2-dimethoxyethane (DME), a diluent solvent, were blended and mixed to prepare an electrolyte solution.

(Preparation of Inorganic Composite Particle)

Alumina (particle size: 0.5 μm, BET specific surface area: 5.9 $m^2/g$) was mixed with an aqueous solution in which 0.33 mass % of N,N-dimethyl-(trihydroxysilyl)propyl-N-sulfopropyl-ammonium, inner salt (compound A) was dissolved such that compound A/alumina=1/100. Thereafter, the mixture was stirred at room temperature (25° C.) for 12 hours to combine the alumina with compound A, and the aqueous solution and the alumina were then separated by filtration to obtain an inorganic composite particle. Here, chemical formula (1) of compound A is shown below.

[Chem. 1]

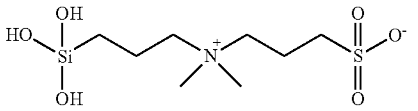

(1)

(Preparation of Electrolyte)

The electrolyte solution and the inorganic composite particle were mixed together such that mass of electrolyte solution excluding diluent solvent/mass of inorganic composite particle=98/2, and the inorganic composite particle was then dispersed in the solution using a planetary centrifugal mixer to prepare an electrolyte solution.

The electrolyte solution prepared was applied onto a SUS foil having a thickness of 20 μm using an applicator and then dried under vacuum at 25° C. for 2 hours. Thereafter, heating was performed under vacuum at 80° C. for 12 hours to polymerize the polyether acrylate, thereby obtaining an electrolyte coating film with a composition ratio shown in Table 1 below. In Tables and others, the betaine in this embodiment and substitutes for the betaine in this embodiment are also referred to collectively as "composite materials". A lithium salt concentration (mol/kg) means a content (mol) of a lithium salt relative to the sum (kg) of contents of an ionic liquid and a polymer. "Ratio of polymer+electrolytic solution" in Tables means the sum (%) of a polymer and an electrolytic solution relative to the total amount of electrolyte. "Ratio of inorganic particle+composite material" in Tables means the sum (%) of an inorganic particle and a composite material relative to the total amount of electrolyte.

The obtained electrolyte film of Example 1-1 was punched to a diameter of ϕ16 and then subjected to AC impedance measurement to calculate ionic conductivity by a method described later.

Example 1-2 to Example 1-4

Electrolyte films were each produced in the same manner as the electrolyte film of Example 1-1 except that the ratio of mass of electrolyte solution excluding diluent solvent/inorganic composite particle mass was changed to a ratio shown in Table 1 below.

Example 1-5 to Example 1-6

Electrolyte films were each produced in the same manner as the electrolyte film of Example 1-1 except that an inorganic composite particle prepared using [2-(methacryloyloxy)ethyl]dimethyl(3-sulfopropyl)ammonium hydroxide, inner salt (compound B) instead of compound A was used and that the ratio of mass of electrolyte solution excluding diluent solvent/inorganic composite particle mass was changed to a ratio shown in Table 1. Here, chemical formula (2) of compound B is shown below.

[Chem. 2]

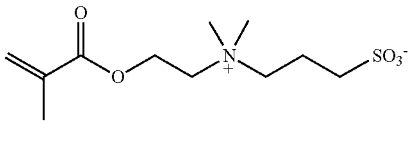

(2)

Example 1-7 to Example 1-8

Electrolyte films were each produced in the same manner as the electrolyte film of Example 1-1 except that an inorganic composite particle prepared using 1-propanaminium, N,N-dimethyl-N-(3-phosphonopropyl)-3-(trimethoxysilyl)-, inner salt (compound C) instead of compound A was used and that the ratio of mass of electrolyte solution excluding diluent solvent/inorganic composite particle mass was changed to a ratio shown in Table 1. Here, chemical formula (3) of compound C is shown below.

[Chem. 3]

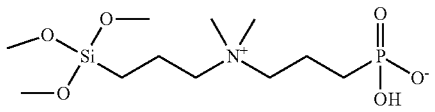

(3)

Example 1-9 to Example 1-10

Electrolyte films were each produced in the same manner as the electrolyte film of Example 1-1 except that an inorganic composite particle prepared using 1-propanaminium, 3-carboxy-N,N-dimethyl-N-[3-(trimethoxysilyl)propyl]-, inner salt (compound D) instead of compound A was used and that the ratio of mass of electrolyte solution excluding diluent solvent/inorganic composite particle mass was changed to a ratio shown in Table 1. Here, chemical formula (4) of compound D is shown below.

[Chem. 4]

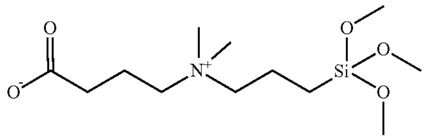

(4)

Comparative Example 1-1

An electrolyte film was produced in the same manner as the electrolyte film of Example 1-1 except that alumina was used instead of the inorganic composite particle prepared using compound A and that the ratio of mass of electrolyte solution excluding diluent solvent/alumina mass was changed to a ratio shown in Table 1.

Comparative Example 1-2

An electrolyte film was produced in the same manner as the electrolyte film of Example 1-1 except that an inorganic composite particle prepared using 1-alkylaminium, N-(carboxymethyl)-N,N-dimethyl-, inner salt (compound E) instead of compound A was used and that the ratio of mass of electrolyte solution excluding diluent solvent/inorganic composite particle mass was changed to a ratio shown in Table 1. Here, chemical formula (5) of compound E is shown below. Compound E has a betaine structure but does not have a functional group other than the betaine structure.

[Chem. 5]

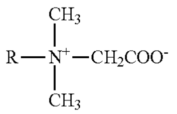

(5)

(In the formula, R represents an alkyl group having 12 to 16 carbon atoms.)

impedance (EIS) using an impedance analyzer (product name: SP-150) manufactured by Bio-Logic SAS at 25° C. and a frequency of 1 MHz to 0.1 Hz to obtain a bulk resistance value of the electrolyte. Using the resistance value obtained and the following formula, the ionic conductivity (σ) of the electrolyte film was obtained.

$$\sigma = l/(s \cdot R)$$

(In the formula, l represents a thickness (cm) of an electrolyte film, s represents a sectional area ($cm^2$), and R represents a bulk resistance value (Ω).)

The results obtained are shown in Table 1 below.

TABLE 1

| | Polymer + electrolytic solution (EMIm-FSI) | | | Inorganic particle + composite material | | | |
|---|---|---|---|---|---|---|---|
| | Polymer:electrolytic solution (mixing ratio) | Lithium salt concentration (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 1-1 | 30:70 | 1.0 | 98 | 100:1 | A | 2 | 2.46 |
| Example 1-2 | 30:70 | 1.0 | 95 | 100:1 | A | 5 | 2.52 |
| Example 1-3 | 30:70 | 1.0 | 75 | 100:1 | A | 25 | 2.2 |
| Example 1-4 | 30:70 | 1.0 | 75 | 100:5 | A | 25 | 2.1 |
| Example 1-5 | 30:70 | 1.0 | 95 | 100:1 | B | 5 | 2.25 |
| Example 1-6 | 30:70 | 1.0 | 95 | 100:0.5 | B | 5 | 2.3 |
| Example 1-7 | 30:70 | 1.0 | 95 | 100:1 | C | 5 | 2.38 |
| Example 1-8 | 30:70 | 1.0 | 75 | 100:1 | C | 25 | 2.14 |
| Example 1-9 | 30:70 | 1.0 | 95 | 100:1 | D | 5 | 2.36 |
| Example 1-10 | 30:70 | 1.0 | 75 | 100:1 | D | 25 | 2.08 |
| Comparative Example 1-1 | 30:70 | 1.0 | 75 | no composite material | | 25 | 1.8 |
| Comparative Example 1-2 | 30:70 | 1.0 | 75 | 100:1 | E | 25 | 1.9 |
| Comparative Example 1-3 | 30:70 | 1.0 | 75 | 100:1 | F | 25 | 1.87 |

Comparative Example 1-3

An electrolyte film was produced in the same manner as the electrolyte film of Example 1-1 except that an inorganic composite particle prepared using trimethyl[3-(trimethoxysilyl)propyl]ammonium chloride (compound F) instead of compound A was used and that the ratio of mass of electrolyte solution excluding diluent solvent/inorganic composite particle mass was changed to a ratio shown in Table 1. Here, chemical formula (6) of compound F is shown below. Compound F does not have a betaine structure.

[Chem. 6]

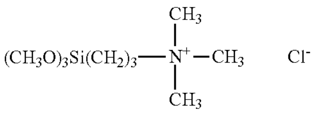

(6)

<Method of Measuring Ionic Conductivity>

The electrolyte film obtained in Example or Comparative Example was measured for thickness (film thickness) and sectional area. The electrolyte obtained was placed in a two-electrode cell and then measured for electrochemical Table 1 shows the following. Specifically, it has been shown that Examples each including an inorganic composite particle that is a composite of an inorganic particle with a compound having a betaine structure and a functional group have higher ionic conductivity than Comparative Examples different from Examples.

By contrast, Comparative Example 1-1 had lower ionic conductivity than Examples because an inorganic particle alone was used instead of the inorganic composite particle. Comparative Example 1-2 had lower ionic conductivity than Examples because an inorganic composite particle prepared using a compound having a betaine structure but not having a functional group was used. Comparative Example 1-3 had lower ionic conductivity than Examples because an inorganic composite particle prepared using a compound not having a betaine structure was used.

B2. Experiment 2

Example 2-1 to Example 2-4

Electrolyte films were each produced in the same manner as the electrolyte film of Example 1-1 except that (i) the lithium salt concentration and (ii) the ratio of mass of electrolyte solution excluding diluent solvent/inorganic composite particle mass were changed as shown in Table 2 below.

Comparative Example 2-1

An electrolyte film was produced in the same manner as the electrolyte film of Example 1-1 except that (i) alumina was used instead of the inorganic composite particle prepared using compound A and that (ii) the lithium salt concentration and (iii) the ratio of mass of electrolyte solution excluding diluent solvent/alumina mass were changed as shown in Table 2.

The results obtained are shown in Table 2 below.

TABLE 2

| | Polymer + electrolytic solution (EMIm-FSI) | | | Inorganic particle + composite material | | | |
|---|---|---|---|---|---|---|---|
| | Polymer:electro-lytic solution (mixing ratio) | Lithium salt concentration (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 2-1 | 30:70 | 2.5 | 95 | 100:1 | A | 5 | 1.3 |
| Example 2-2 | 30:70 | 2.5 | 75 | 100:1 | A | 25 | 1.2 |
| Example 2-3 | 30:70 | 3.5 | 95 | 100:1 | A | 5 | 0.9 |
| Example 2-4 | 30:70 | 3.5 | 75 | 100:1 | A | 25 | 0.9 |
| Comparative Example 2-1 | 30:70 | 3.5 | 75 | no composite material | | 25 | 0.73 |

Table 2 shows the following. Specifically, comparison between Example 2-1 to Example 2-4 and Comparative Example 2-1 shows that also when the lithium salt concentration is different from that in Experiment 1, Examples each including an inorganic composite particle that is a composite of an inorganic particle with a compound having a betaine structure and a functional group have higher ionic conductivity than Comparative Example different from Examples.

B3. Experiment 3

Example 3-1 to Example 3-2

Electrolyte films were each produced in the same manner as the electrolyte film of Example 1-1 except that 1-methyl-1-propyl-pyrrolidinium bis(fluorosulfonyl)imide (MPPy-FSI) (manufactured by DKS Co., Ltd., product name: ELEXCEL IL-120) was used instead of EMIm-FSI as the electrolytic solution and that the ratio of mass of electrolyte solution excluding diluent solvent/inorganic composite particle mass was changed to a ratio shown in Table 3 below.

Comparative Example 3-1

An electrolyte film was produced in the same manner as the electrolyte film of Example 1-1 except that alumina was used instead of the inorganic composite particle, that MPPy-FSI was used instead of EMIm-FSI as the electrolytic solution, and that the ratio of mass of electrolyte solution excluding diluent solvent/alumina mass was changed to a ratio shown in Table 3.

The results obtained are shown in Table 3 below.

TABLE 3

| | Polymer + electrolytic solution (MPPy-FSI) | | | Inorganic particle + composite material | | | |
|---|---|---|---|---|---|---|---|
| | Polymer:electro-lytic solution (mixing ratio) | Lithium salt concentration (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 3-1 | 30:70 | 1.0 | 95 | 100:1 | A | 5 | 1.35 |
| Example 3-2 | 30:70 | 1.0 | 75 | 100:1 | A | 25 | 1.21 |
| Comparative Example 3-1 | 30:70 | 1.0 | 75 | no composite material | | 25 | 1.06 |

Table 3 shows the following. Specifically, comparison between Example 3-1 to Example 3-2 and Comparative Example 3-1 shows that also when an electrolytic solution different from that in Experiment 1 is used, Examples each including an inorganic composite particle that is a composite of an inorganic particle with a compound having a betaine structure and a functional group have higher ionic conductivity than Comparative Example different from Examples.

B4. Experiment 4

Example 4-1 to Example 4-2

Electrolyte films were each produced in the same manner as the electrolyte film of Example 1-1 except that lithium bis(trifluoromethanesulfonyl)imide (LiTFSI) was used instead of LiFSI as the lithium salt and that the ratio of mass of electrolyte solution excluding diluent solvent/inorganic composite particle mass was changed to a ratio shown in Table 4 below.

Comparative Example 4-1

An electrolyte film was produced in the same manner as the electrolyte film of Example 1-1 except that alumina was used instead of the inorganic composite particle, that LiTFSI was used instead of LiFSI as the lithium salt, and that the ratio of mass of electrolyte solution excluding diluent solvent/alumina mass was changed to a ratio shown in Table 4.

The results obtained are shown in Table 4 below.

TABLE 4

| | Polymer + electrolytic solution (EMIm-FSI) | | | Inorganic particle + composite material | | | |
|---|---|---|---|---|---|---|---|
| | Polymer:electrolytic solution (mixing ratio) | Lithium salt (LiTFSI) construction (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 4-1 | 30:70 | 1.0 | 95 | 100:1 | A | 5 | 2.07 |
| Example 4-2 | 30:70 | 1.0 | 75 | 100:1 | A | 25 | 1.73 |
| Comparative Example 4-1 | 30:70 | 1.0 | 75 | no composite material | | 25 | 1.51 |

Table 4 shows the following. Specifically, comparison between Example 4-1 to Example 4-2 and Comparative Example 4-1 shows that also when a lithium salt different from that in Experiment 1 is used, Examples each including an inorganic composite particle that is a composite of an inorganic particle with a compound having a betaine structure and a functional group have higher ionic conductivity than Comparative Example different from Examples.

B5. Experiment 5

Example 5-1 to Example 5-2

Electrolyte films were each produced in the same manner as the electrolyte film of Example 1-1 except that lithium tetrafluoroborate ($LiBF_4$) was used instead of LiFSI as the lithium salt and that the ratio of mass of electrolyte solution excluding diluent solvent/inorganic composite particle mass was changed to a ratio shown in Table 5 below.

Comparative Example 5-1

An electrolyte film was produced in the same manner as the electrolyte film of Example 1-1 except that alumina was used instead of the inorganic composite particle, that $LiBF_4$ was used instead of LiFSI as the lithium salt, and that the ratio of mass of electrolyte solution excluding diluent solvent/alumina mass was changed to a ratio shown in Table 5.

The results obtained are shown in Table 5 below.

TABLE 5

| | Polymer + electrolytic solution (EMIm-FSI) | | | Inorganic particle + composite material | | | |
|---|---|---|---|---|---|---|---|
| | Polymer:electrolytic solution (mixing ratio) | Lithium salt ($LiBF_4$) construction (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 5-1 | 30:70 | 1.0 | 95 | 100:1 | A | 5 | 2.38 |
| Example 5-2 | 30:70 | 1.0 | 75 | 100:1 | A | 25 | 2.04 |
| Comparative Example 5-1 | 30:70 | 1.0 | 75 | no composite material | | 25 | 1.86 |

Table 5 shows the following. Specifically, comparison between Example 5-1 to Example 5-2 and Comparative Example 5-1 shows that also when a lithium salt different from that in Experiment 1 is used, Examples each including an inorganic composite particle that is a composite of an inorganic particle with a compound having a betaine structure and a functional group have higher ionic conductivity than Comparative Example different from Examples.

B6. Experiment 6

Example 6-1 to Example 6-2

Electrolyte films were each produced in the same manner as the electrolyte film of Example 1-1 except that ethylene carbonate (EC)/propylene carbonate (PC)=1/1 was used instead of EMIm-FSI as the electrolytic solution, that lithium hexafluorophosphate ($LiPF_6$) was used instead of LiFSI as the lithium salt, and that the ratio of mass of electrolyte solution excluding diluent solvent/inorganic composite particle mass was changed to a ratio shown in Table 6 below.

Comparative Example 6-1

An electrolyte film was produced in the same manner as the electrolyte film of Example 1-1 except that alumina was used instead of the inorganic composite particle, that EC/PC=1/1 was used instead of EMIm-FSI as the electrolytic solution, that $LiPF_6$ was used instead of LiFSI as the lithium salt, and that the ratio of mass of electrolyte solution excluding diluent solvent/alumina mass was changed to a ratio shown in Table 6.

The results obtained are shown in Table 6 below.

TABLE 6

| | Polymer + electrolytic solution (EC/PC + $LiPF_6$) | | | Inorganic particle + composite material | | | |
|---|---|---|---|---|---|---|---|
| | Polymer:electrolytic solution (mixing ratio) | Lithium salt ($LiPF_6$) construction (mol/kg) | Ratio of polymer + electrolytic solution (%) | Inorganic particle:composite material (mixing ratio) | Composite material type | Ratio of inorganic particle + composite material (%) | Ionic conductivity (mS/cm) |
| Example 6-1 | 30:70 | 1.0 | 95 | 100:1 | A | 5 | 1.82 |
| Example 6-2 | 30:70 | 1.0 | 75 | 100:1 | A | 25 | 1.52 |
| Comparative Example 6-1 | 30:70 | 1.0 | 75 | no composite material | | 25 | 1.37 |

Table 6 shows the following. Specifically, comparison between Example 6-1 to Example 6-2 and Comparative Example 6-1 shows that also when a lithium salt and an electrolytic solution different from those in Experiment 1 are used, Examples each including an inorganic composite particle that is a composite of an inorganic particle with a compound having a betaine structure and a functional group have higher ionic conductivity than Comparative Example different from Examples.

B7. Experiment 7

Example 7-1

(Preparation of Inorganic Composite Particle)

An inorganic composite particle was obtained in the same manner as in Example 1-1.

(Preparation of Composite Electrolyte)

After 34.5 parts by mass of a 10 mass % polyurethane/N-methylpyrrolidone (NMP) solution having a carbonate skeleton and a molecular weight of about 60,000, a matrix material, 20.3 parts by mass of EMImFSI (manufactured by DKS Co., Ltd., product name: ELEXCEL IL-110), an electrolyte solvent, and 3.8 parts by mass of LiFSI, a lithium salt, were mixed, 41.4 parts by mass of the inorganic composite particle was dispersed in the solution using a planetary centrifugal mixer to prepare a composite electrolyte solution.

The composite electrolyte solution prepared was applied onto a SUS foil having a thickness of 20 μm using an applicator and then dried at 80° C. for 6 hours. Thereafter, heating was performed under vacuum at 80° C. for 10 hours to obtain a composite electrolyte coating film with a composition ratio shown in Table 7 below.

The obtained composite electrolyte film of Example 7-1 was punched to a diameter of ϕ16 and then subjected to AC impedance measurement to calculate ionic conductivity.

Example 7-2

A composite electrolyte film was produced in the same manner as the composite electrolyte film of Example 7-1 except that the ratio of electrolyte solution mass/inorganic composite particle mass was changed to a ratio shown in Table 7.

Comparative Example 7-1 to Comparative Example 7-2

Composite electrolyte films were each produced in the same manner as the composite electrolyte film of Example 7-1 except that alumina was used instead of the inorganic composite particle and that the ratio of electrolyte solution mass/alumina mass was changed to a ratio shown in Table 7.

The results obtained are shown in Table 7 below.

TABLE 7

| | Polymer (polyurethane) + electrolytic solution (EMIm-FSI) | | | Inorganic particle + composite material | | | | |
|---|---|---|---|---|---|---|---|---|
| | Polymer:electrolytic solution (mixing ratio) | Lithium salt concentration (mol/kg) | Ratio of polymer + electrolytic solution (%) | Inorganic particle type | Inorganic particle:composite material (mixing ratio) | Composite material type | Ratio of inorganic particle + composite material (%) | Ionic conductivity (mS/cm) |
| Example 7-1 | 5:35 | 1.0 | 40 | alumina | 100:1 | A | 60 | 0.78 |
| Example 7-2 | 5:30 | 1.0 | 35 | alumina | 100:1 | A | 65 | 0.64 |
| Comparative Example 7-1 | 5:35 | 1.0 | 40 | alumina | no composite material | | 60 | 0.46 |
| Comparative Example 7-2 | 5:30 | 1.0 | 35 | alumina | no composite material | | 65 | 0.4 |

Table 7 shows the following. Specifically, comparison between Example 7-1 to Example 7-2 and Comparative Example 7-1 to Comparative Example 7-2 shows that also when a polymer different from that in Experiment 1 is used, Examples each including an inorganic composite particle that is a composite of an inorganic particle with a compound having a betaine structure and one or more functional groups other than the betaine structure have higher ionic conductivity than Comparative Examples different from Examples.

B8. Experiment 8

Example 8-1

(Preparation of Inorganic Composite Particle)

$Li_{1+x+y}Ti_{2-x}Al_xP_{3-y}Si_yO_{12}$ (0<x<2, 0<y<3) (LATP) serving as an inorganic particle was mixed with an aqueous solution in which 0.33 mass % of compound A above was dissolved such that compound A/LATP=1/100. Thereafter, the mixture was stirred at room temperature (25° C.) for 12 hours to combine compound A with the inorganic particle, and the aqueous solution and the inorganic particle were then separated by filtration to obtain an inorganic composite particle.

(Preparation of Electrolyte Powder)

After 2.5 parts by mass of polyvinylidene difluoride (PVDF) (molecular weight: about 300,000), a matrix material, 6.3 parts by mass of EMImFSI (manufactured by DKS Co., Ltd., product name: ELEXCEL IL-110), an electrolyte solvent, 1.2 parts by mass of LiFSI, a lithium salt, and 50 parts by mass of DME, a diluent solvent, were mixed, the inorganic composite particle was dispersed in the solution using a planetary centrifugal mixer to prepare an electrolyte solution. Thereafter, the diluent solvent was dried under reduced pressure to obtain an electrolyte powder.

(Production of Electrolyte Pellet)

About 0.3 g of the prepared electrolyte powder was placed in a cylindrical mold having a diameter of #12 and then uniaxially pressed for 30 seconds under a pressure of 200 $kgf/cm^2$ to produce an electrolyte pellet with a composition ratio shown in Table 8 below.

The electrolyte pellet obtained was measured for thickness and then subjected to AC impedance measurement to calculate ionic conductivity.

Example 8-2

An electrolyte pellet was produced in the same manner as the electrolyte pellet of Example 8-1 except that $Li_7La_3Zr_2O_{12}$ (LLZ) was used instead of LATP as the inorganic particle.

Example 8-3

An electrolyte pellet was produced in the same manner as the electrolyte pellet of Example 8-1 except that La—Li—Ti perovskite oxide (LLT) was used instead of LATP as the inorganic particle.

Example 8-4

An electrolyte pellet was produced in the same manner as the electrolyte pellet of Example 8-1 except that $Li_{1.5}Al_{0.5}Ge_{1.5}(PO_4)_3$ (LAGP) was used instead of LATP as the inorganic particle.

Comparative Example 8-1 to Comparative Example 8-2

Electrolyte pellets were each produced in the same manner as the electrolyte pellet of Example 8-1 except that LATP was used instead of the inorganic composite particle and that the ratio of mass of electrolyte solution excluding diluent solvent/LATP mass was changed to a ratio shown in Table 8.

The results obtained are shown in Table 8 below.

TABLE 8

| | Polymer (PVDF) + electrolytic solution (EMIm-FSI) | | | Inorganic particle + composite material | | | | |
|---|---|---|---|---|---|---|---|---|
| | Polymer:electrolytic solution (mixing ratio) | Lithium salt concentration (mol/kg) | Ratio of polymer + electrolytic solution (%) | Inorganic particle type | Inorganic particle:composite material (mixing ratio) | Composite material type | Ratio of inorganic particle + composite material (%) | Ionic conductivity (mS/cm) |
| Example 8-1 | 5:15 | 1.0 | 20 | LATP | 100:1 | A | 80 | 0.097 |
| Example 8-2 | 5:15 | 1.0 | 20 | LLZ | 100:1 | A | 80 | 0.095 |
| Example 8-3 | 5:15 | 1.0 | 20 | LLT | 100:1 | A | 80 | 0.083 |
| Example 8-4 | 5:15 | 1.0 | 20 | LAGP | 100:1 | A | 80 | 0.08 |
| Comparative Example 8-1 | 5:15 | 1.0 | 20 | LATP | no composite material | | 80 | 0.073 |
| Comparative Example 8-2 | 5:5 | 1.0 | 10 | LATP | no composite material | | 90 | 0.015 |

Table 8 shows the following. Specifically, comparison between Example 8-1 to Example 8-4 and Comparative Example 8-1 to Comparative Example 8-2 shows that also when an inorganic particle different from that in Experiment 1 is used, Examples each including an inorganic composite particle that is a composite of an inorganic particle with a compound having a betaine structure and a functional group have higher ionic conductivity than Comparative Examples different from Examples.

The present invention is not limited to the above-described embodiments and can be practiced in various configurations without departing from the spirit of the invention. For example, the technical features in the embodiments and examples corresponding to the technical features in the aspects described in the section of Summary of Invention can be appropriately exchanged or combined in order to partially or completely solve the above-described problem or to partially or fully achieve the above-described effects.

Any of the technical features can be appropriately omitted unless it is described as essential in this specification.

INDUSTRIAL APPLICABILITY

The electrolyte of this embodiment has high ionic conductivity. Thus, a power storage device including the electrolyte of this embodiment can be suitably used as a power supply for mobile devices and is also useful for, for example, wearable devices, electric tools, electric bicycles, electric wheelchairs, robots, electric vehicles, emergency power supplies, and bulk stationary power supplies.

The invention claimed is:

1. An electrolyte comprising an inorganic composite particle that is a composite of an inorganic particle with a compound having a betaine structure and one or more functional groups selected from a (meth)acryloxy group, a $Si(OR)_3$ group (R is a hydrogen atom or an alkyl group having 1 to 3 carbon atoms), and an $Al(OR)_2$ group (R is a hydrogen atom or an alkyl group having 1 to 3 carbon atoms), wherein a content of the compound is 0.1 parts by mass or more and 10 parts by mass or less relative to 100 parts by mass of a content of the inorganic particle, and a content of the inorganic composite particle is 1 part by mass or more and 50 parts by mass or less relative to 100 parts by mass of the electrolyte.

2. The electrolyte according to claim 1, wherein the one or more functional groups are one or more selected from a (meth)acryloxy group and a $Si(OR)_3$ group (R is a hydrogen atom or an alkyl group having 1 to 3 carbon atoms).

3. The electrolyte according to claim 1, wherein the betaine structure has a quaternary ammonium cation and one or more selected from $SO_3^-$, $PO_3H^-$, and $COO^-$.

4. The electrolyte according to claim 1, wherein the inorganic particle has a BET specific surface area of 1.0 $m^2/g$ or more.

5. A power storage device comprising the electrolyte according to claim 1.

6. The electrolyte according to claim 1, wherein the betaine structure is at least one structure selected from N,N-dimethyl-(trihydroxysilyl)propyl-N-sulfopropyl-ammonium, inner salt, [2-(methacryloyloxy)ethyl]dimethyl (3-sulfopropyl)ammonium hydroxide, inner salt, 1-propanaminium, N,N-dimethyl-N-(3-phosphonopropyl)-3-(trimethoxysilyl)-, inner salt, 1-propanaminium, 3-carboxy-N,N-dimethyl-N-[3-(trimethoxysilyl)propyl]-, inner salt, and 1-propanaminium, N,N-dimethyl-N-(3-boronopropyl)-3-(trimethoxysilyl)-, inner salt.

* * * * *